United States Patent
Rhee et al.

(10) Patent No.: US 7,286,831 B2
(45) Date of Patent: Oct. 23, 2007

(54) METHOD OF BALANCING LOAD AND METHOD OF SETTING UP CALL USING THE SAME IN GENERAL PACKET RADIO SERVICE NETWORK

(75) Inventors: Eun Jun Rhee, Seoul (KR); Won Ryu, Daejeon (KR)

(73) Assignees: Electronics and Telecommunications Research Institute (KR); KT Corporation (KR)

( * ) Notice: Subject to any disclaimer, the term of this patent is extended or adjusted under 35 U.S.C. 154(b) by 601 days.

(21) Appl. No.: 10/817,363

(22) Filed: Apr. 1, 2004

(65) Prior Publication Data

US 2005/0122942 A1    Jun. 9, 2005

(30) Foreign Application Priority Data

Dec. 5, 2003    (KR) ............... 10-2003-0088173

(51) Int. Cl.
*H04Q 7/20*    (2006.01)
(52) U.S. Cl. ............ 455/453; 455/452.1; 455/456.1; 370/338
(58) Field of Classification Search ........ 455/436–442, 455/445, 450, 451, 452.1, 453, 455, 456.1, 455/456.2; 370/338, 337, 312, 313, 328, 370/386
See application file for complete search history.

(56) References Cited

U.S. PATENT DOCUMENTS 7,123,910 B2 * 10/2006 Lucidarme et al. ......... 455/434

2004/0147262 A1 * 7/2004 Lescuyer et al. ........... 455/434

FOREIGN PATENT DOCUMENTS

| KR | 1020030047102 | 6/2003 |
| KR | 1020030067089 | 8/2003 |
| KR | 1020030005548 | 1/2005 |
| WO | WO 03/032604 A1 | 4/2003 |

OTHER PUBLICATIONS

Scalable Gateway GPRS Support Node for GPRS/UMTS Networks, p. 2239-2243.
"Packet Routing Control Method for Mobile Communication Network" by Akihiro Morita et al.; *Technical Report of IEICE.* NS2002-94 RCS2002-122 (Jul. 2002); pp. 21-25, abstract.

* cited by examiner

*Primary Examiner*—Tony T. Nguyen
(74) *Attorney, Agent, or Firm*—Blakely, Sokoloff, Taylor & Zafman (57) ABSTRACT

The present invention relates to a method of balancing a load and method of setting up a call using the load balancing method in a General Packet Radio Service (GPRS) network, which prevents a load from concentrating on a specific Gateway GPRS Supporting Node (GGSN) in the GPRS network, thus reducing a probability of failure in session establishment due to increased traffic. In the load balancing method, when a Service GPRS Supporting Node (SGSN) connected to a mobile node establishes a session, it selects a GGSN having a smallest number of established sessions among a plurality of GGSNs corresponding to an Access Point Name (APN) included in an Activate PDP Context Request message received from the mobile node and requests the selected GGSN to establish a session, thus solving a problem in which a load concentrates on a specific GGSN.

6 Claims, 7 Drawing Sheets

FIG. 1

PRIOR ART

| Octets | Bits | | | | | | | |
|---|---|---|---|---|---|---|---|---|
| | 8 | 7 | 6 | 5 | 4 | 3 | 2 | 1 |
| 1 | Version | | | PT | (*) | E | S | PN |
| 2 | Message Type ||||||||
| 3 | Length (1st Octet) ||||||||
| 4 | Length (2nd Octet) ||||||||
| 5 | Tunnel Endpoint Identifier (1st Octet) ||||||||
| 6 | Tunnel Endpoint Identifier (2nd Octet) ||||||||
| 7 | Tunnel Endpoint Identifier (3rd Octet) ||||||||
| 8 | Tunnel Endpoint Identifier (4th Octet) ||||||||
| 9 | Sequence Number (1st Octet)[1)][4) ] ||||||||
| 10 | Sequence Number (2nd Octet)[1)][4)] ||||||||
| 11 | N-PDU Number[2)][4)] ||||||||
| 12 | Next Extension Header Type[3)][4)] ||||||||

GTP HEADER FORMAT

FIG. 4a

| Information element | Presence requirement |
|---|---|
| IMSI | Conditional |
| Routeing Area Identity (RAI) | Optional |
| Recovery | Optional |
| Selection mode | Conditional |
| Tunnel Endpoint Identifier Data I | Mandatory |
| Tunnel Endpoint Identifier Control Plane | Conditional |
| NSAPI | Mandatory |
| Linked NSAPI | Conditional |
| Charging Characteristics | Conditional |
| Trace Reference | Optional |
| Trace Type | Optional |
| End User Address | Conditional |
| Access Point Name | Conditional |
| Protocol Configuration Options | Optional |
| SGSN Address for signalling | Mandatory |
| SGSN Address for user traffic | Mandatory |
| MSISDN | Conditional |
| Quality of Service Profile | Mandatory |
| TFT | Conditional |
| Trigger Id | Optional |
| OMC Identity | Optional |
| Private Extension | Optional |

INFORMAITON ELEMENTS OF CREATE PDP CONTEXT REQUEST MESSAGE

FIG. 4b

| Information element | Presence requirement |
|---|---|
| Cause | Mandatory |
| Reordering required | Conditional |
| Recovery | Optional |
| Tunnel Endpoint Identifier Data I | Conditional |
| Tunnel Endpoint Identifier Control Plane | Conditional |
| Charging ID | Conditional |
| End User Address | Conditional |
| Protocol Configuration Options | Optional |
| GGSN Address for Control Plane | Conditional |
| GGSN Address for user traffic | Conditional |
| Alternative GGSN Address for Control Plane | Conditional |
| Alternative GGSN Address for user traffic | Conditional |
| Quality of Service Profile | Conditional |
| Charging Gateway Address | Optional |
| Alternative Charging Gateway Address | Optional |
| Private Extension | Optional |

INFORMATION ELEMENTS OF CREATE PDP CONTEXT RESPONSE MESSAGE

FIG. 4c

| CONFIGURATION INFORMATION | DESCRIPTION |
|---|---|
| IMSI | USER IDENTIFICATION INFORMATION (SUBSCRIBER PHONE NUMBER) |
| SGSN-C | TEID-C VALUE GENERATED BY SGSN |
| SGSN-U | TEID-U VALUE GENERATED BY SGSN |
| GGSN-C | TEID-C VALUE GENERATED BY SGSN |
| GGSN-U | TEID-U VALUE GENERATED BY SGSN |

TABLE INFORMATION FOR SESSION IDENTIFICATION IN SGSN AND GGSN

FIG. 5

METHOD OF BALANCING LOAD AND METHOD OF SETTING UP CALL USING THE SAME IN GENERAL PACKET RADIO SERVICE NETWORK

BACKGROUND OF THE INVENTION

1. Field of the Invention

The present invention relates, in general, to general packet radio service systems for providing packet-based wireless communication services and, more particularly, to a method of balancing a load and method of setting up a call using the load balancing method in a general packet radio service network, which solves a phenomenon in which a load concentrates on a specific gateway general packet radio service system supporting node, thus reducing factors which deteriorate the performance of services, such as a failure in session establishment.

2. Description of the Related Art

Recently, in order to extend a data network to a wireless communication network, the concept of General Packet Radio Service (GPRS) has been proposed. GPRS is defined by a high-speed data transmission service provided when a user accesses an Internet Protocol (IP) network and a packet network through a wireless terminal to transmit packet data in a mobile communication system.

The GPRS network allows non-voice information to be added to information transmitted or received through a wireless communication system, and enables a connection to the conventional wired Internet, thus enabling a user to use Internet services at a mobile node, such as a mobile phone or Personal Digital Assistant (PDA) terminal.

Figure 1:
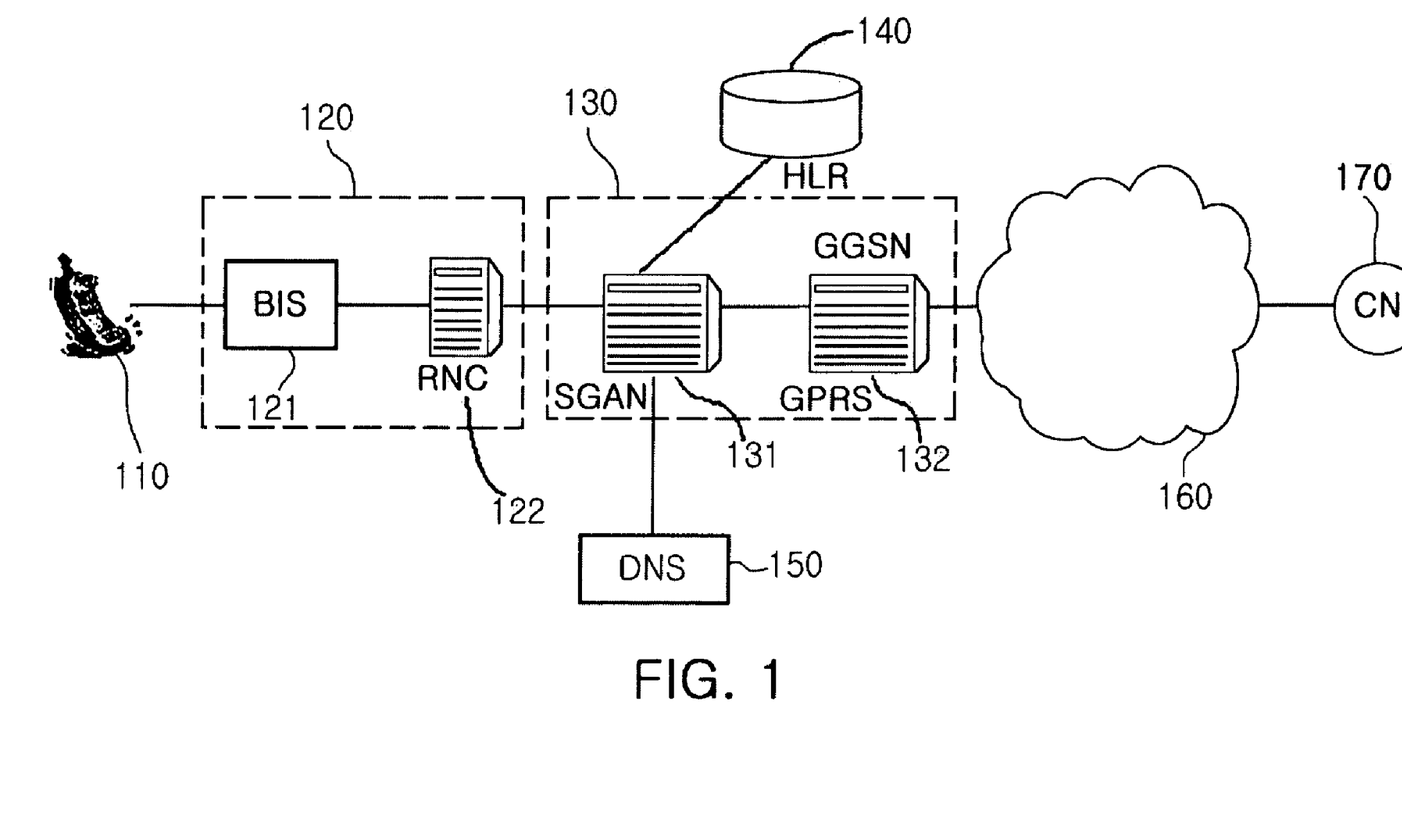
FIG. 1 is a view showing the basic construction of an asynchronous mobile communication network including a GPRS network.

FIG. 1 is a view showing the network configuration of an asynchronous mobile communication system including a GPRS network. Reference numerals used in FIG. 1 are defined below.

Reference numeral 110 represents a mobile node used by a user, which corresponds to a mobile phone or PDA terminal. When the user requests the mobile node 110 to access GPRS, the mobile node 110 transmits the request to a higher system, and transmits/receives data by the completion of a session establishment.

Reference numeral 120 represents a wireless network which is a wireless interface section of data transmission/reception channels to the mobile node 110. Reference numeral 130 represents a GPRS network capable of providing packet services to the wireless network 120. The GPRS network 130 includes a Service GPRS Supporting Node (SGSN) 131 for configuring session information in conjunction with a Home Location Register (HLR) 140 and transmitting/receiving data packets to/from the mobile node 110 within a service area, and a gateway GPRS supporting node (GGSN) 132 connected to a Public Domain Network (PDN) 160 to connect between the GPRS network and an external packet network and then enable packet data services to be provided to the mobile node 110 of the user.

Further, reference numeral 140 represents the Home Location Register (HLR), which is a database used to manage various pieces of information, such as terminal information, subscription information, location information and authentication information of a subscriber in wireless communications. Reference numeral 150 represents a Domain Name System (DNS) server, which maintains a database related to domain names and IP addresses corresponding to the domain names, and provides an IP address of a destination in response to a request received from the Service GPRS Supporting Node (SGSN) 131.

Further, reference numeral 160 represents the Public Domain Network (PDN), and 170 represents a correspondent node (CN), which the mobile node 110 connected to the PDN 160 requires to access.

In the above configuration, the SGSN 131 of the GPRS 130 performs functions, such as packet routing and transmission, mobility management, logical link management, authentication and billing. The HLR 140 operated in conjunction with the SGSN 131 stores and manages location information (for example, cell or visitor location register) and user profile information (International Mobile Subscriber Identity: IMSI) of a GPRS subscriber registered in the SGSN 131, etc. Further, the GGSN 132 converts GPRS packets transmitted through a tunnel established with the SGSN 131 into suitable Packet Data Protocol (PDP)-format data (for example, IP, X.25), transmits the PDP-format data to the Correspondent Node (CN) 170 through the PDP network 160, converts a PDP address of packet data received through the PDP network 160 into a Global System for Mobile communications (GSM) address of a GPRS subscriber, converts the corresponding packet data into GPRS data, and transmits the GPRS data to the SGSN 131.

Figure 2:
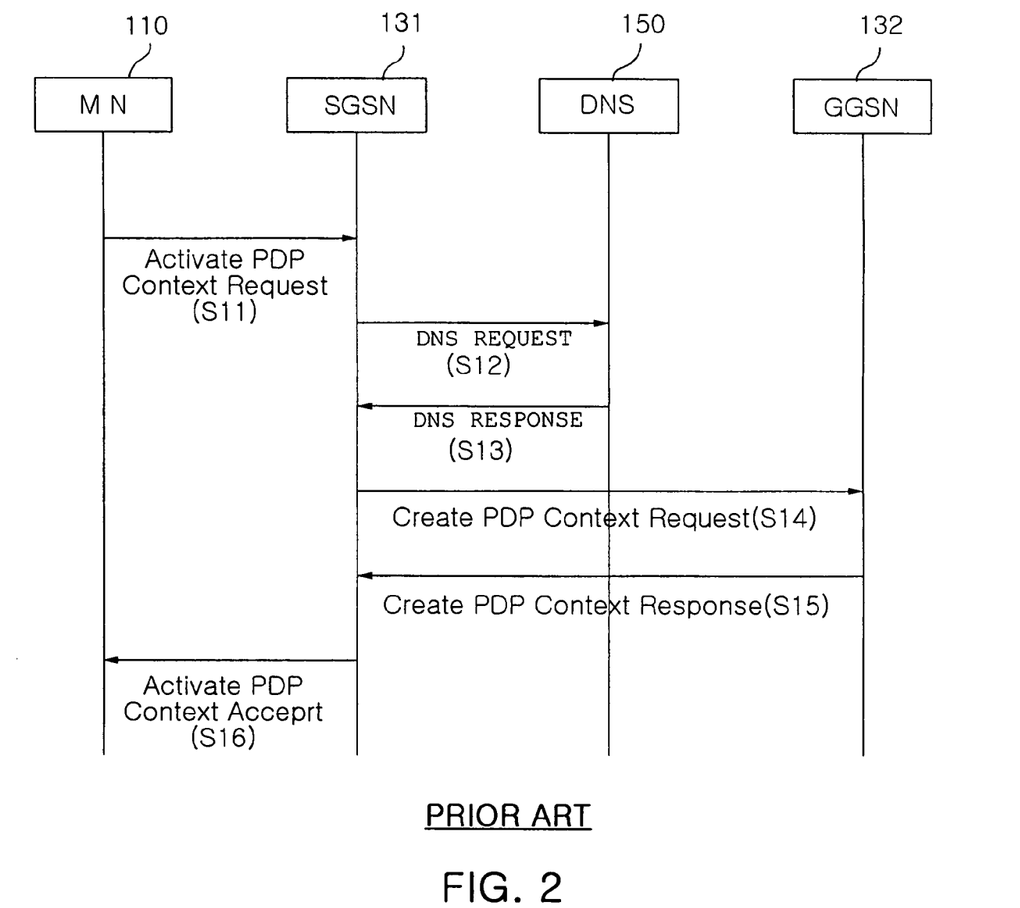
FIG. 2 is a flowchart showing a call setup process in the GPRS network.

FIG. 2 is a view showing a typical call setup process in the GPRS network of FIG. 1. Referring to FIG. 2, call setup in the GPRS network 130 starts by transmitting an Activate PDP Context Request message from the mobile node 110 requiring a packet data service (that is, GPRS) to the SGSN 131 connected to the wireless network 120 at step S11.

As described above, the SGSN 131 having received the Activate PDP Context Request message from the mobile node 110 selects an accessible GGSN 132 using an Access Point Name (APN) included in the received message, and requests an IP address corresponding to the GGSN 132 from the DNS server 150 at step S12.

Therefore, the DNS server 150 searches for the IP address corresponding to the GGSN 132 and transmits the searched IP address to the SGSN 131 at step S13. The SGSN 131 having received the IP address transmits a Create PDP Context Request message to the GGSN 132 specified by the IP address at step S14. The GGSN 132 having received the Create PDP Context Request message performs resource allocation to the mobile node 110 of the corresponding user in response to the Create PDP Context Request message, and transmits the results of the resource allocation to the SGSN 131 through a Create PDP Context Response message at step S15. Further, the SGSN 131 configures session information on the basis of the contents of the received response message, and transmits an Activate PDP Context Accept message to the mobile node 110 at step S16. Thereafter, the mobile node 110 performs the transmission/reception of packet data to/from the correspondent node 170 through a tunnel allocated between the SGSN 131 and the GGSN 132.

As described above, in order for the mobile node 110 to be provided with GPRS, the PDP context establishment of allocating a tunnel between the SGSN 131 connected to the mobile node 110 and the GGSN 132 connected to the correspondent node 170 should be performed.

At this time, the SGSN 131 must search for GGSNs 132 related to APN included in the Activate PDP Context Request message received from the mobile node 110 and select one among the searched GGSNs 132 so as to create PDP contexts. However, occasionally, there may occur a case in which two or more GGSNs supporting the corresponding APN exist. In prior art, because GGSN is selected according to specified priority regardless of the number of sessions established with each GGSN, the same GGSN may be selected at each time. Therefore, there are problems in that requests for a session establishment concentrate on a specific GGSN, which increases the probability of failure in session establishment.

SUMMARY OF THE INVENTION

Accordingly, the present invention has been made keeping in mind the above problems occurring in the prior art, and an object of the present invention is to provide a method of balancing a load and method of setting up a call using the load balancing method in a General Packet Radio Service (GPRS) network, which prevents a load from concentrating on a specific Gateway GPRS Supporting Node (GGSN), thus reducing a probability of failure in session establishment and providing optimal service performance.

In order to accomplish the above object, the present invention provides a method of balancing a load in a General Packet Radio Service (GPRS) network, the GPRS network including a plurality of Service GPRS Supporting Nodes (SGSNs) connected to a mobile node and a plurality of Gateway GPRS Supporting Nodes (GGSNs) connected to a Public Domain Network (PDN), wherein each of the SGSNs selects one of a plurality of GGSNs capable of supporting a same Access Point Name (APN) and then establishes a session, the selected one having a smallest number of established sessions.

Preferably, the load balancing method may comprise the steps of a) receiving an Activate PDP Context Request message from the mobile node; b) extracting an Access Point Name (APN) related to a correspondent node from the received Activate PDP Context Request message; c) searching for GGSNs capable of supporting GPRS for the extracted APN; d) comparing numbers of sessions established with the searched GGSNs, respectively, to each other and selecting a GGSN having a smallest number of established sessions by the SGSN; and e) requesting a session establishment from the selected GGSN.

Preferably, in the load balancing method, the step d) may comprise the steps of d1) initializing a variable m representing a number of selectable GGSNs to the number of GGSNs searched at step c), and initializing a variable n representing selection priorities of the GGSNs to "1"; d2) ascertaining the number of sessions established with each of the GGSNs searched at step c); d3) selecting a GGSN having sessions, the number of which is n-th in an ascending order, of the searched GGSNs and requesting an IP address corresponding to the selected GGSN from a Domain Name System (DNS) server; d4) determining whether the IP address corresponding to the selected GGSN is obtained from the DNS server; d5) decreasing the variable m by "1" if the IP address is not obtained at step d4), and determining whether the variable m is "0"; d6) transmitting an error message if the variable m is "0", while increasing the variable n by "1" and then performing steps d3) to d6) if the variable m is not "0"; and d7) setting the selected GGSN to a node from which the SGSN will request a session establishment if the IP address is obtained from the DNS server at step d4).

Preferably, in the load balancing method, the step d2) may be performed so that the SGSN searches for session configuration information stored after establishing a session with each of the GGSNs.

In addition, the present invention provides a method of setting up a call in a General Packet Radio Service (GPRS) network, the GPRS network including a plurality of Service GPRS Supporting Nodes (SGSNs) connected to a mobile node and a plurality of Gateway GPRS Supporting Nodes (GGSNs) connected to a Public Domain Network (PDN), comprising the steps of a) transmitting an Activate PDP Context Request message including Access Point Name (APN) information to a corresponding SGSN by the mobile node; b) searching for GGSNs capable of supporting GPRS for APN included in the Activate PDP Context Request message by the SGSN having received the Request message; c) treating the Activate PDP Context Request message as an error and informing the mobile node that a session establishment is disapproved if any GGSN corresponding to the APN does not exist at step b); d) ascertaining a number of sessions established with each of searched GGSNs by the SGSN if one or more GGSNs corresponding to the APN exist at step b); e) requesting from a Domain Name System (DNS) server an IP address corresponding to a GGSN having a smallest number of established sessions of the plurality of the searched GGSNs; f) obtaining the IP address in response to the request and transmitting a Create PDP Context Request message to the IP address; g) receiving the Create PDP Context Request message, performing resource allocation and session information configuration, generating a Create PDP Context Response message and transmitting the Create PDP Context Response message to the corresponding SGSN by a GGSN designated by the IP address; and h) receiving the Create PDP Context Response message, configuring session information and transmitting an Activate PDP Context Accept message to the mobile node by the SGSN.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Reference now should be made to the drawings, in which the same reference numerals are used throughout the different drawings to designate the same or similar components.

Figure 3:
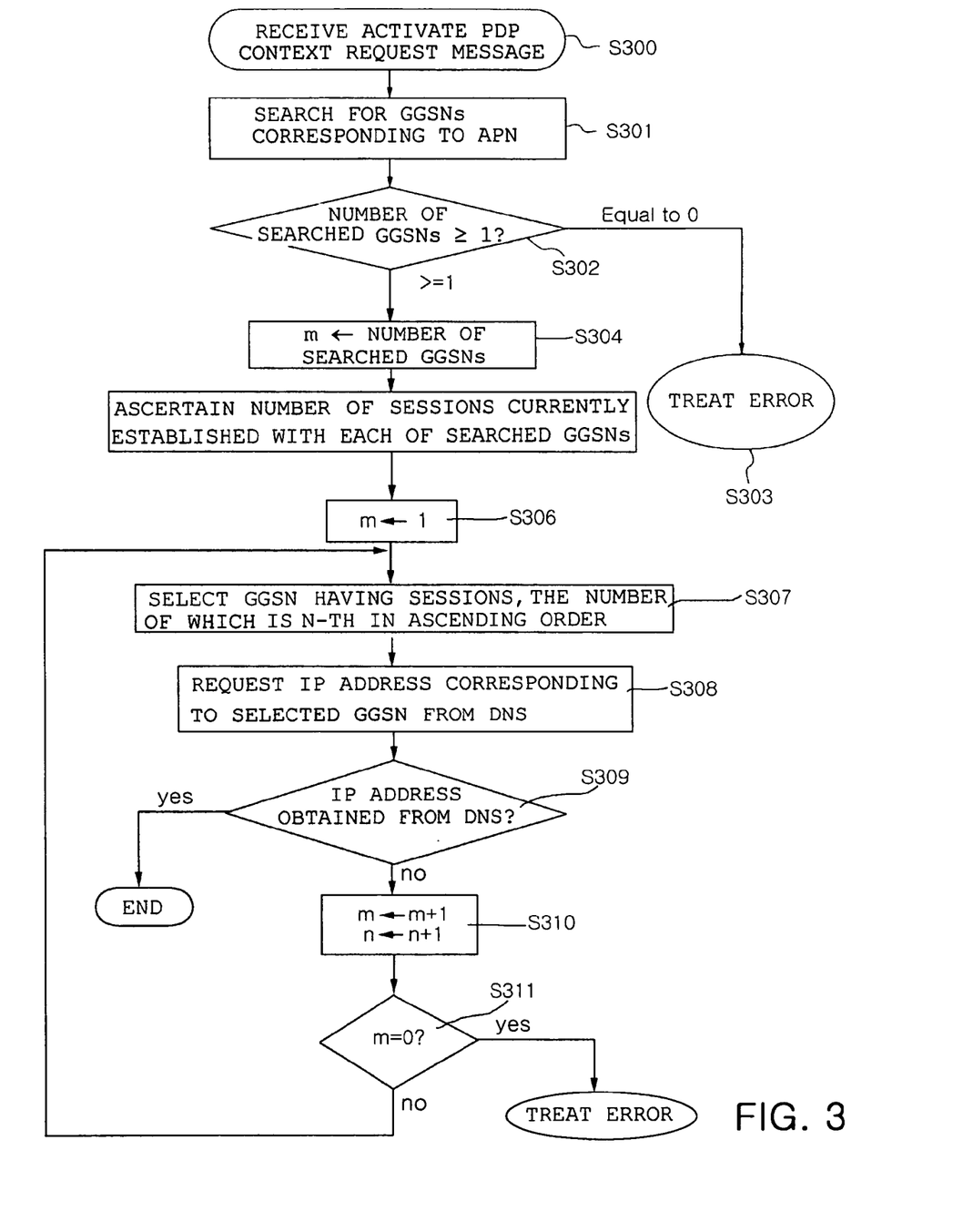
FIG. 3 is a flowchart of a method of balancing a load according to the present invention.

FIG. 3 is a flowchart of a method of balancing a load according to the present invention.

Referring to FIG. 3, when receiving an Activate PDP Context Request message from a predetermined mobile node 110 at step S300, the SGSN 131 extracts APN information from the received Activate PDP Context Request message and searches for GGSNs supporting a corresponding APN on the basis of the APN information at step S301.

Generally, the SGSN 131 has information of all of GGSNs 132 included in the GPRS network 130, and searches the information for any GGSN 132 capable of supporting the GPRS provided for the user's desired APN. At this time, no GGSN supporting the GPRS provided for the APN may be searched for, and one or more GGSNs may be searched for. In the former case, an access to the GPRS requested by the mobile node 110 cannot be performed. In the latter case, a suitable single GGSN should be selected to perform the access to the GPRS requested by the mobile node 110.

Therefore, after performing the search operation, the SGSN 131 determines whether the number of GGSNs capable of supporting the access to the corresponding APN is "0" at step S302.

As a result of the determination, if any GGSN corresponding to the extracted APN information does not exist, the SGSN 131 cannot process the received Activate PDP Context Request message and then treats the Activate PDP Context Request message as an error at step S303. At this time, the SGSN 131 transmits an error message for the request message to the mobile node 110.

In contrast, if there are one or more GGSNs corresponding to the extracted APN information, the SGSN 131 initializes a variable m representing the number of selectable GGSNs to the number of searched GGSNs at step S304. Thereafter, the SGSN 131 ascertains the number of sessions currently established with each of a plurality of searched GGSNs at step S305. Further, the SGSN 131 initializes a variable n representing selection priorities for the GGSNs to "1" at step S306.

In the above process, the ascertainment of the number of sessions for each of the searched GGSNs 132, performed by the SGSN 131, is described in detail.

Figure 4A:
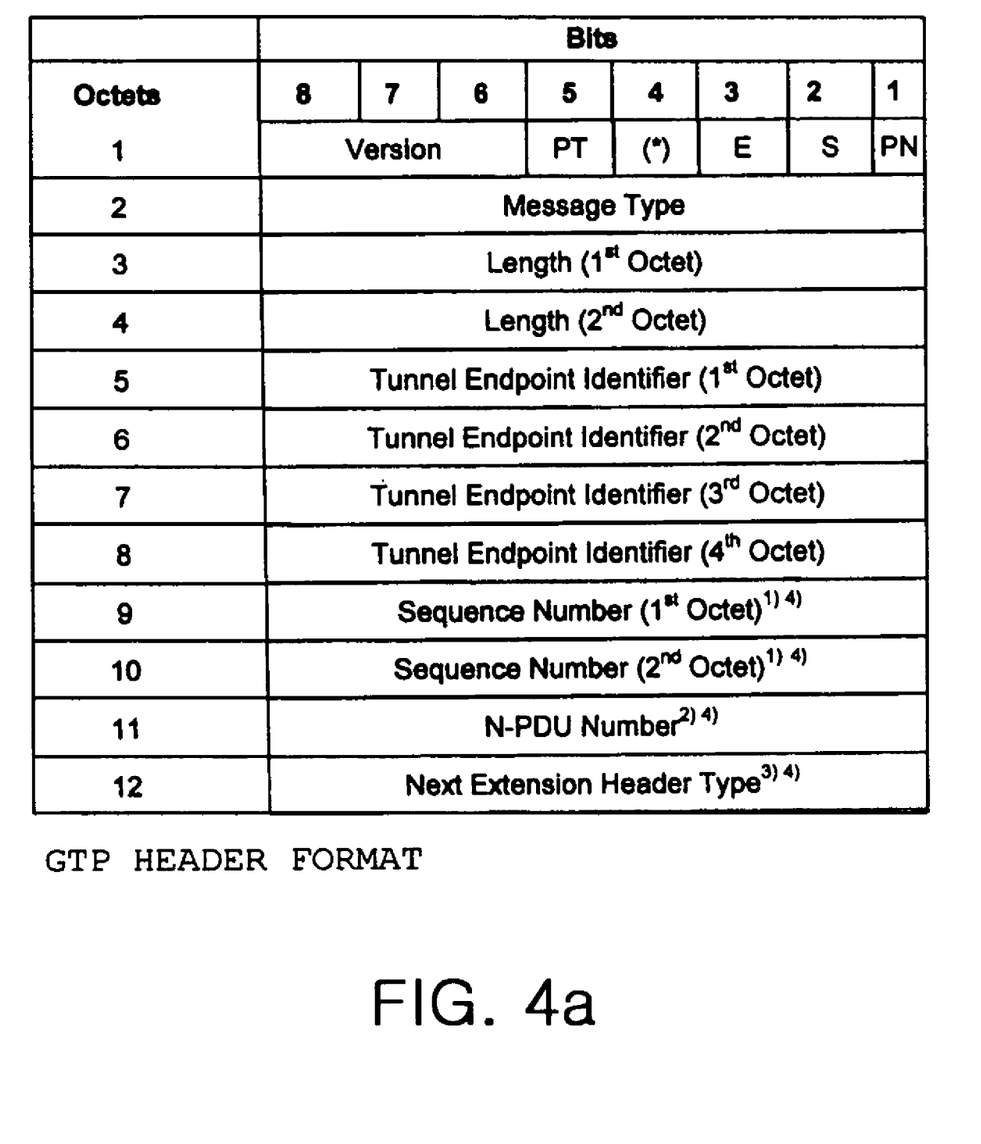
FIG. 4a illustrates a table showing a GTP header format used in the GPRS network.
Figure 4B:
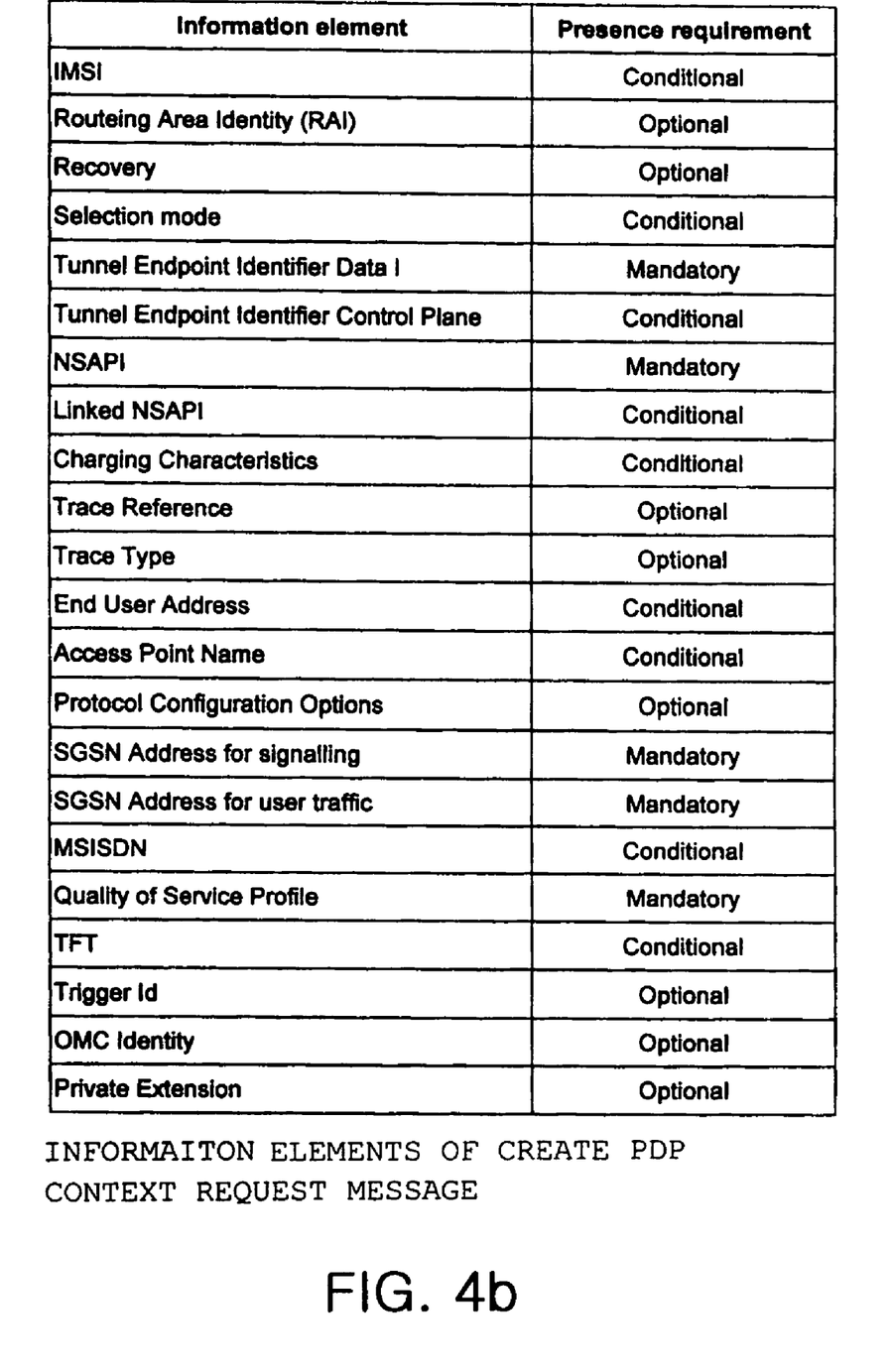
FIG. 4b illustrates a table showing information elements included in a Create PDP Context Request message.
Figure 4C:
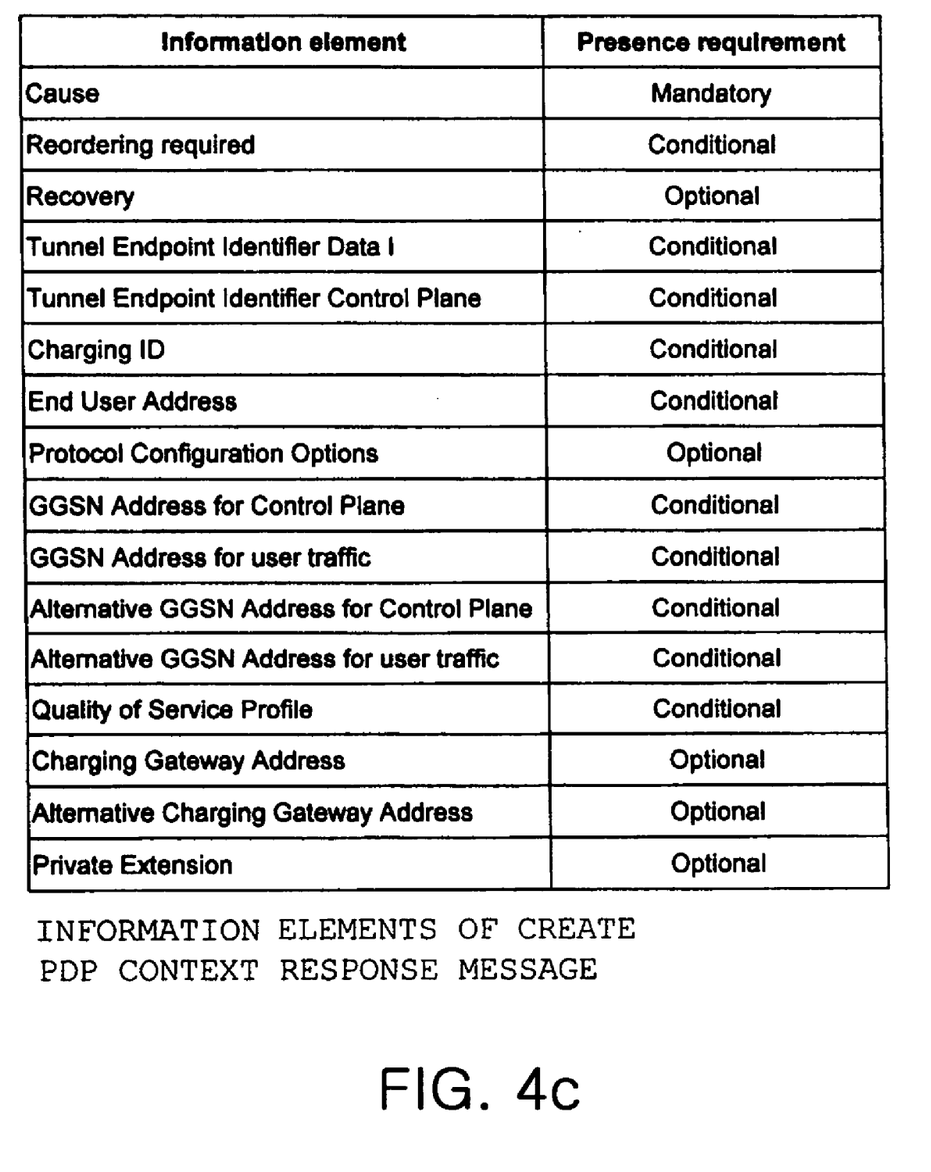
FIG. 4c illustrates a table showing information elements included in a Create PDP Context Response message.

Generally, an interface between the SGSN 131 and the GGSN 132 in the GPRS network 130 complies with GPRS Tunneling Protocol (GTP). The GTP is divided into a GTP-C interface used to transmit control messages and a GTP-U interface used to transmit data. As shown in FIG. 4a, a GTP header is constructed so that a Tunnel Endpoint Identifier (TEID) field is included and the value of a message type field varies according to a message type. Further, information elements included in each message vary depending on a message type. FIG. 4b illustrates a table showing information elements included in a Create PDP Context Request message, and FIG. 4c illustrates a table showing information elements included in a Create PDP Context Response message.

In the call setup process described above with reference to FIG. 2, the Create PDP Context Request message transmitted from the SGSN 131 to the GGSN 132 is configured so that the TEID field of the header shown in FIG. 4a is set to "0" so as to establish a session with the selected GGSN 132, an identifier value of the SGSN 131 for an established GTP-U session is entered in a Tunnel Endpoint Identifier Data I (TEID-U) field of the information elements shown in FIG. 4b, and an identifier value thereof for an established GTP-C session is entered in a Tunnel Endpoint Identifier Control plane (TEID-C) field of the information elements. The SGSN 131 transmits the Create PDP Context Request message configured in this way to the GGSN 132.

The GGSN 132 having received the Create PDP Context Request message stores therein a TEID value for user traffic included in the Create PDP Context Request message, generates a Create PDP Context Response message, and transmits the Create PDP Context Response message to the SGSN 131. At this time, the Create PDP Context Response message is transmitted, with a value, which is stored in the TEID-C field of the Create PDP Context Request message received from the SGSN 131 being entered in the TEID field of the GTP header, and with identifier values of the GGSN 132 being entered in the TEID-U and TEID-C fields of the information elements.

Consequently, the SGSN 131 and the GGSN 132 configure, store and manage session ID information for the GTP-C and GTP-U interfaces, respectively. As shown in a table of FIG. 5, each session configuration information is formed to include user identification information and TEID-C and TEID-U values generated by the SGSN 131 and the GGSN 132, respectively, with respect to a single session.

Figure 5:
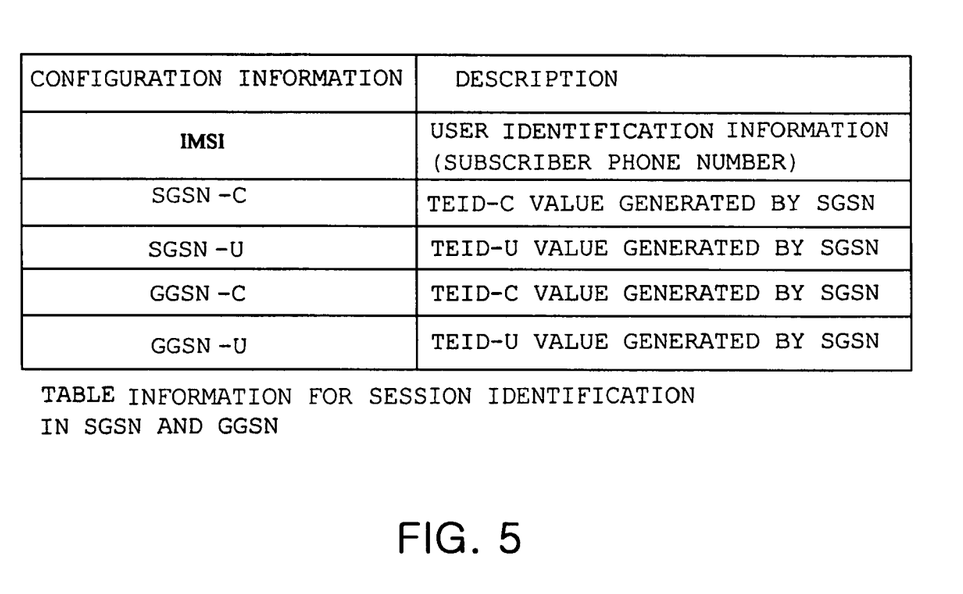
FIG. 5 is a view showing the configuration of a session table implemented in a SGSN and a GGSN in the GPRS network.

That is, the SGSN 131 stores and manages configuration information used to identify a session, which the SGSN 131 is establishing currently, so that the SGSN 131 can identify the currently established session by searching the stored session configuration information.

Therefore, the SGSN 131 searches the stored session configuration information at step S305 for ascertaining the number of sessions established with each of the GGSNs, thus ascertaining the number of sessions currently established with each of the GGSNs searched at step S301.

As described above, if the number of sessions currently established with each of the searched GGSNs has been ascertained, the SGSN 131 selects a GGSN having established sessions, the number of which is n-th in an ascending order, among the GGSNs at step S307.

Further, the SGSN 131 requests an IP address corresponding to the GGSN 132 selected at step S307 from the DNS server 150 at step S308, and determines whether the IP address is obtained from the DNS server 150 in response to the request at step S309. If the IP address corresponding to the selected GGSN 132 is not received from the DNS server 150, the establishment of a PDP Context with the selected GGSN 132 is not possible, so that another GGSN should be selected.

Therefore, the SGSN 131 determines whether the IP address corresponding to the selected GGSN is obtained at step S309. If the IP address corresponding to the selected GGSN is obtained, a procedure of selecting a GGSN is terminated because a suitable GGSN 132 that will perform the establishment of a PDP context according to the request from the mobile node 110 is selected. In contrast, if the obtainment of the IP address corresponding to the selected GGSN fails, the SGSN 131 decreases the variable m representing the number of selectable GGSNs by "1", and increases the variable n representing the priorities of GGSNs to be selected by "1" so as to select another GGSN capable of establishing a PDP context at step S310.

Further, the SGSN 131 determines whether the variable m representing the number of selectable GGSNs is "0" at step S311. If the variable m representing the number of selectable GGSNs is "0", the SGSN 131 transmits to the mobile node 110 an error message indicating that the establishment of a PDP context is disapproved because any GGSN capable of supporting GPRS for the APN requested by the mobile node 110 does not exist any longer at step S312. In contrast, if the variable m is not "0", the SGSN 131 returns to step S307 to select a GGSN having established sessions, the number of which is n-th in an ascending order, among the GGSNs searched at step S301, and then requests an IP address corresponding to the selected GGSN from the DNS server 150 at step S308.

Through the above process, if the IP address corresponding to a predetermined one of finally searched GGSNs is obtained, the SGSN 131 transmits an Activate PDP Context Request message to the corresponding GGSN 132 shown in FIG. 2 on the basis of the obtained IP address at step S14.

Therefore, when receiving the Activate PDP Context Request message for the predetermined APN from the mobile node 110, the SGSN 131 selects a GGSN having a smallest number of currently established sessions, that is, a smallest amount of traffic, among GGSNs capable of supporting the GPRS for the APN, and transmits the Create PDP Context Request message to the selected GGSN. That is, rates at which the SGSN 131 selects a plurality of GGSNs capable of supporting GPRS provided for the same APN are made uniform.

Further, the GGSN 132 having received the Create PDP Context Request message generates a Create PDP Context Response message including an allocated TEID value and transmits the response message to the SGSN 131 after performing TEID allocation and session information configuration at step S15.

Therefore, from a viewpoint of the plurality of GGSNs 132 provided in the GPRS network 120, reception rates at which the GGSNs 132 supporting the same APN receive a Create PDP Context Request message are made uniform, so that rates at which sessions are established with the GGSNs 132 supporting the same APN establish sessions are made uniform. Consequently, traffic concentration on a specific GGSN does not occur, thus realizing load balancing in the GPRS network.

The above-described steps of the present invention can be implemented by a computer-readable program recorded on a recording medium. In this case, the computer-readable recording medium includes all the types of data recording media in which data readable by a computer system is stored. Further, the program can be executed through distributed processing by a plurality of computer systems connected to each other through a network.

As described above, the present invention provides a method of balancing a load and method of setting up a call using the load balancing method in a GPRS network, which allows a SGSN to select a GGSN having a minimum load at the time of establishing a corresponding session while coping with APN information received from a mobile node and to request a session establishment from the GGSN, in a call setup process of allowing a wireless terminal to use GPRS, thus reducing a probability of failure in session establishment and improving the service performance of a GPRS system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method comprising:
   balancing a load in a General Packet Radio Service (GPRS) network, the GPRS network including a plurality of Service GPRS Supporting Nodes (SGSNs) connected to a mobile node and a plurality of Gateway GPRS Supporting Nodes (GGSNs) connected to a Public Domain Network (PDN),
   extracting an Access Point Name (APN) related to a correspondent node from a received Activate PDP Context Request message; and
   comparing numbers of sessions established with searched GGSNs, respectively, to each other and selecting a GGSN having a smallest number of established sessions by the SGSN,
   wherein each of the SGSNs selects one of a plurality of GGSNs capable of supporting a (APN) and then establishes a session from the selected GGSN, the selected GGSN having a smallest number of established sessions.

2. The method according to claim 1, comprising:
   receiving an Activate PDP Context Request message from the mobile node;
   searching for GGSNs capable of supporting GPRS for the extracted APN;
   requesting a session establishment from the selected GGSN.

3. The method according to claim 2, wherein comparing numbers of sessions comprises:
   initializing a variable m representing a number of selectable GGSNs to the number of GGSNs searched, and initializing a variable n representing selection priorities of the GGSNs to "1";
   ascertaining the number of sessions established with each of the GGSNs searched at;
   selecting a GGSN having sessions, the number of which is n-th in an ascending order, of the searched GGSNs and requesting an IP address corresponding to the selected GGSN from a Domain Name System (DNS) server;
   determining whether the IP address corresponding to the selected GGSN is obtained from the DNS server;
   decreasing the variable m by "1" if the TIP address is not obtained in the determining whether the TIP address corresponding to the selected GGSN is obtained from the DNS server, and determining whether the variable m is "0";
   transmitting an error message if the variable m is "0", while increasing the variable n by "1" and then performing the selecting GGSN having sessions, the whether the TIP address corresponding to the selected GGSN is obtained from the DNS server, and the transmitting an error messagete if the variable m is not "0"; and
   setting the selected GGSN to a node from which the SGSN will request a session establishment if the TIP address is obtained from the DNS server from the determining whether the TIP address corresponding to the selected GGSN is obtained from the DNS server.

4. The method according to claim 3, wherein the ascertaining is performed so that the SGSN searches session configuration information stored after establishing a session with each of the GGSNs.

5. A method of setting up a call in a General Packet Radio Service (GPRS) network, the GPRS network including a plurality of Service GPRS Supporting Nodes (SGSNs) connected to a mobile node and a plurality of Gateway GPRS Supporting Nodes (GGSNs) connected to a Public Domain Network (PDN), comprising the steps of:
   a) transmitting an Activate PDP Context Request message including Access Point Name (APN) information to a corresponding SGSN by the mobile node;
   b) searching for GGSNs capable of supporting GPRS for APN included in the Activate PDP Context Request message by the SGSN having received the Request message;
   c) treating the Activate PDP Context Request message as an error and informing the mobile node that a session establishment is disapproved if any GGSN corresponding to the APN does not exist at step b);

d) ascertaining a number of sessions established with each of searched GGSNs by the SGSN if one or more GGSNs corresponding to the APN exist at step b);

e) requesting from a Domain Name System (DNS) server an IP address corresponding to a GGSN having a smallest number of established sessions of the plurality of the searched GGSNs;

f) obtaining the IP address in response to the request and transmitting a Create PDP Context Request message to the IP address;

g) receiving the Create PDP Context Request message, performing resource allocation and session information configuration, generating a Create PDP Context Response message and transmitting the Create PDP Context Response message to the corresponding SGSN by a GGSN designated by the IP address; and h) receiving the Create PDP Context Response message, configuring session information and transmitting an Activate PDP Context Accept message to the mobile node by the SGSN.

6. The call setup method according to claim 5, further comprising the step of repeatedly performing an operation of requesting from the DNS server an IP address corresponding to a GGSN having a next smallest number of established sessions until the IP address corresponding to the previously selected GGSN is obtained if the IP address is not obtained from the DNS server.

* * * * *